(12) United States Patent
Iwata

(10) Patent No.: US 6,950,376 B2
(45) Date of Patent: Sep. 27, 2005

(54) OPTICAL HEAD AND OPTICAL DISK APPARATUS

(75) Inventor: Katsuo Iwata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 598 days.

(21) Appl. No.: 10/128,514

(22) Filed: Apr. 24, 2002

(65) Prior Publication Data

US 2003/0081514 A1 May 1, 2003

(30) Foreign Application Priority Data

Apr. 27, 2001 (JP) ........................................ 2001-133304

(51) Int. Cl.⁷ ............................................... G11B 7/00
(52) U.S. Cl. ............................... 369/44.32; 369/112.01; 369/112.1
(58) Field of Search ........................ 369/112.01, 112.1, 369/44.32, 44.23, 44.24, 112.05, 112.15, 44.25, 44.26, 112.03, 110.03

(56) References Cited

U.S. PATENT DOCUMENTS 5,815,293 A * 9/1998 Komma et al. ................ 359/19

FOREIGN PATENT DOCUMENTS

| JP | 8-240718 | 9/1996 |
| JP | 11-195229 | 7/1999 |
| JP | 2000-11402 | 1/2000 |
| JP | 2000-76665 | 3/2000 |

* cited by examiner

Primary Examiner—Nabil Z. Hindi
(74) Attorney, Agent, or Firm—Pillsbury Winthrop Shaw Pittman LLP

(57) ABSTRACT

A light beam is applied to an optical disk through a first hologram and an objective lens. The first hologram has a first region that can diffract light and a second region that can diffract light. The light beam reflected from the optical disk is applied through the objective lens to a second hologram. The second hologram splits the light beam into a first light beam and a second light beam that have passed through the first region and the second region, respectively.

5 Claims, 4 Drawing Sheets

OPTICAL HEAD AND OPTICAL DISK APPARATUS

CROSS-REFERENCE TO RELATED APPLICATIONS

This application is based upon and claims the benefit of priority from the prior Japanese Patent Application No. 2001-133304, filed Apr. 27, 2001, the entire contents of which are incorporated herein by reference.

BACKGROUND OF THE INVENTION

1. Field of the Invention

The present invention relates to an optical head and an optical disk apparatus, each designed to record and reproduce data on and reproducing data from optical disks. More particularly, the invention relates to an optical head that can detect the thickness of the transparent substrate of any optical disk and an optical disk apparatus that comprises such an optical head.

2. Description of the Related Art

As well known in the art, optical disks comprise a transparent substrate and a hard protective layer. The interface between the substrate and the protective layer serves as a recording surface. A focused light beam emitted from an optical head may be applied to an optical disk. The light beam passes through the transparent substrate, reaching the recording surface. Data is thereby recorded on, or read from, the recording surface.

Generally, the transparent substrates of optical disks fail to have a design thickness, because they have been formed in different manufacturing conditions. The difference between the thickness of the substrate and the design thickness (hereinafter referred to as "thickness error") is about tens of microns ($\mu$m) in most cases. The thickness error results in spherical aberration. Due to the spherical aberration, the light spots the light beams passing though transparent substrates, which differ in thickness, form on the recording surfaces differ in shape.

This not only decreases the density of recording data on the recording surface, but also degrades the reliability of recording data thereon. Further, this degrades the reliability of reproducing data from the recording surface. It is inevitably difficult to record and reproduce data reliably and stably, on and from the optical disk.

To record and reproduce data reliably and stably, on and from an optical disk, the optical head needs to decrease the spherical aberration in the optical disk to a tolerant value. To change the spherical aberration appropriately, the spherical aberration must be determined with precision. For precise determination of the spherical aberration, it is necessary to measure the thickness of the transparent substrate.

Jpn. Pat. Appln. KOKAI Publication No. 2000-76665, for example, discloses a system for determining the thickness of a transparent substrate. The system comprises means comprises light-emitting means for emitting a light beam to the transparent substrate and light-receiving means for receiving the light beam reflected from the substrate. Both the light-emitting means and the light-receiving means are incorporated in an optical head.

The system may further comprise an objective lens, the center part of which differs in curvature from the peripheral part. Of the light beam passing through the objective lens, only the part that has passed through the center part is used to determine the thickness of the transparent substrate.

Alternatively, the system may further comprise a hologram element arranged on the optical path of the optical head. In this case, the thickness of the transparent substrate is determined from the primary refracted light emanating from the hologram element. The light reflected from the recording surface and the surface of the transparent substrate is led to a hologram. The hologram splits the light into two light beams. A photodetector detects the light beams. It and generates a focusing error signal from one of the light beams, or the light reflected from the recording surface. It also generates a signal from the other of the light beams, the light reflected from the surface of the transparent substrate. The two signals, thus generated, are subjected to an arithmetic operation. More precisely, the magnitude of the focusing error signal generated is subtracted from a product of a prescribed proportion coefficient and the signal generated from the light reflected from the surface of the transparent substrate. The difference obtained is a signal that represents the thickness of the transparent substrate.

In the system comprising an objective lens, however, a light beam applied to the recording surface travels in one optical path, and the light beam reflected from the recording surface travels in another optical path. This renders it difficult to split a signal and, ultimately, to generate a signal that accurately represents the thickness of the transparent substrate. To make the matter worse, the range over which the thickness error of the transparent substrate can be detected is inevitably the same as the range over which the focusing error can be detected. This is inevitably because the hologram element spits the light reflected from the recording surface and the surface of the transparent substrate.

In the system comprising a hologram element that can diffract light, the primary refracted light emanating from the hologram element arranged on the optical path of the optical head is used to determine the thickness of the transparent substrate. When a light beam is applied to the optical disk, 0th-order diffracted light is generated. When the light beam is reflected from the optical disk, high-order diffracted light is generated. It is therefore difficult to split a signal.

As has been pointed out, with the conventional systems for determining the thickness of the transparent substrate of an optical disk it is difficult to separate the light reflected from the recording surface of the optical disk from the light reflected from the transparent substrate. Further, the conventional system that comprises an objective lens is disadvantageous in that the range over which the thickness error of the transparent substrate can be detected is inevitably the same as the range over which the focusing error can be detected.

BRIEF SUMMARY OF THE INVENTION

The present invention has been made in view of the foregoing. An object of the invention is to provide an optical disk and an optical disk apparatus, both designed to split a light beam reflected from an optical disk, into a light beam reflected from the recording surface of the disk and a light beam reflected from a surface of the transparent substrate of the optical disk, and also an optical disk apparatus. The range over which to detect the thickness error of the transparent substrate is set independently of the range over which to detect the focusing error of the optical head. Thus, the thickness error of the transparent substrate can be detected accurately.

According to one aspect of the present invention, there is provided an optical head which focuses a light beam emitted from a light source, on an optical disk through an objective lens, and which receives a light beam reflected from the optical disk and applied through the objective lens, into an electric signal. The optical head comprises: first optical system which guides the light beam emitted from the light source, to the objective lens through a first hologram having a first region and a second region, the first region being incapable of diffracting light beams and the second region being capable of diffracting light beams; second optical system which guides a light beam reflected from the optical disk and applied through the objective lens, to a second hologram, which splits the light beam into a first light beam and a second light beam, the first light beam having passed through the first region of the first hologram, and the second light beam having passed through the second region of the first hologram; and a photodetector which converts the first and second light beams generated by the second hologram, into electric signals.

According to another aspect of the invention, there is provided an optical disk apparatus comprising an optical head and a photodetector. The optical head comprises: first optical system which guides the light beam emitted from a light source, to an objective lens through a first hologram having a first region and a second region, the first region being incapable of diffracting light beams and the second region being capable of diffracting light beams; second optical system which guides a light beam reflected from an optical disk and applied through the objective lens, to a second hologram, which splits the light beam into a first light beam and a second light beam, the first light beam having passed through the first region of the first hologram, and the second light beam having passed through the second region of the first hologram; and a photodetector having a first light-receiving region which receives the first light beam from the second hologram and a second light-receiving region which receives the second light beam from the second hologram, the first and second light-receiving regions being spaced part to generate signals that are to be processed to correspond to a focusing error of the objective lens. The detecting section generates a first focusing error signal from a signal output from the first light-receiving region, generates a second focusing error signal from a signal output from the second light-receiving region, and detects a thickness error of a transparent substrate of the optical disk, from the first and second focusing error signals.

DETAILED DESCRIPTION OF THE INVENTION

Figure 1:
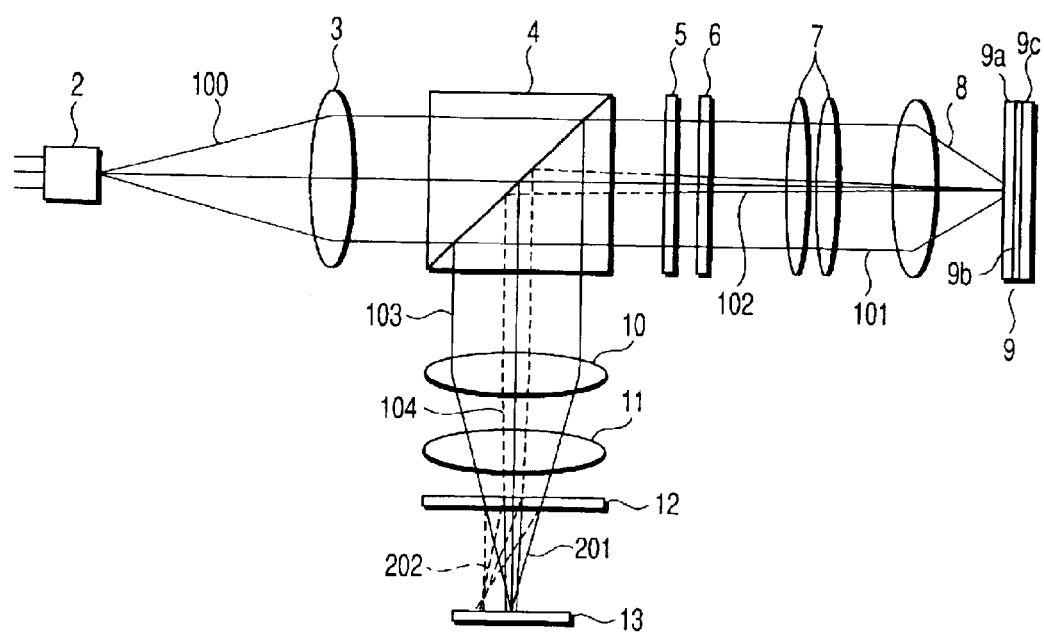
FIG. 1 is an exploded view of the optical system incorporated in an optical head that is an embodiment of this invention.

An embodiment of the present invention will be described in detail, with reference to the accompanying drawings. FIG. 1 shows the optical system incorporated in the embodiment that is an optical head. The optical head comprises a semiconductor laser 2, a collimate lens 3, a polarized beam splitter 4, and a polarized hologram 5. The semiconductor laser 2 emits a light beam 100. The collimate lens 3 receives the light beam and converts it to a parallel light beam. The parallel light beam passes through the polarized beam splitter 4 and reaches the polarized hologram 5.

Figure 2:
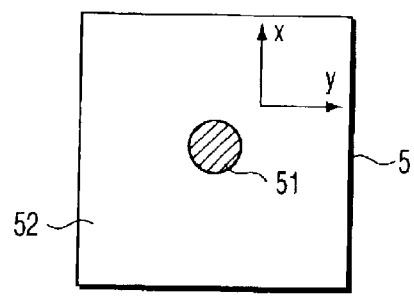
FIG. 2 is a diagram illustrating, in detail, the configuration of the polarized hologram used in the embodiment.

As FIG. 2 shows, the center part of the polarized hologram 5 is a diffraction region 51. The diffraction region 51 functions as a lens. The other part, or peripheral part 52 of the polarized hologram 5 is a transparent plate having two parallel sides and, hence, having no function of diffracting incoming light.

The center part 51 of the polarized hologram 5 diffracts only a linearly polarized beam traveling in the direction of arrow y shown in FIG. 2. The center part 51 does not diffract a linearly polarized beam traveling in the direction of arrow x shown in FIG. 2.

Therefore, the light beam 100 emitted from the polarized hologram 5 is a linearly polarized beam that travels in the direction y. The light beam 100 is split into a 0th-order light beam 101 that has passed through the peripheral part 52 of the hologram 5 and a first-order diffracted light beam 102 that has passed through the center part 51 of the hologram 5.

Both the 0th-order light beam 101 and the first-order diffracted light beam 102 are applied to a quarter-wave plate 6. The quarter-wave plate 6 converts them to a circular polarized beam. The circular polarized beam passes through a spherical-aberration compensating mechanism 7 and reaches an objective lens 8. The objective lens 8 focuses the beam. The beam thus focused passes through the transparent substrate 9a of an optical disk 9 and is applied to the recording surface 9b of the optical disk 9. The recording surface 9b is provided on the hard protective layer 9c of the optical disk 9.

Light beam 103, or the 0th-order light beam 101 reflected from the recording surface 9b, and light beam 104, or the first-order diffracted light beam 102 reflected from the surface of the transparent substrate 9a, pass through the objective lens 8 and the spherical-aberration compensating mechanism 7 until it reaches the quarter-wave plate 6. The quarter-wave plate 6 converts the light beams 103 and 104, both being circular polarized beams, to linearly polarized beams that travel in the direction x. These linearly polarized beams are applied to the polarized hologram 5.

Both beams 103 and 104 are linearly polarized light beans traveling in the direction x. Therefore, that component of either beam which is applied to the center part 51 of the hologram 5 is passes the hologram 5, either, not diffracted.

After passing through the hologram 5, the light beams 103 and 104 are reflected at right angle by the polarized beam splitter 4. Then, the light beams 103 and 104 pass through a condenser lens 10 and a cylindrical lens 11 that constitute an astigmatism-detecting system. The light beams 103 and 104 are applied to a hologram 12.

The hologram 12 splits the light beam 103 into a 0th-order light beam 201-0 and a first-order diffracted light beam 201-1. The hologram 12 splits the light beam 104 into a 0th-order light beam 202-0 and a first-order diffracted light beam 202-1. These light beams 201-0, 201-1, 202-0 and 202-1 are applied to a photodetector 13. The photodetector 13 converts these light beams into electric signals.

Figures 3A, 3B, 3C:
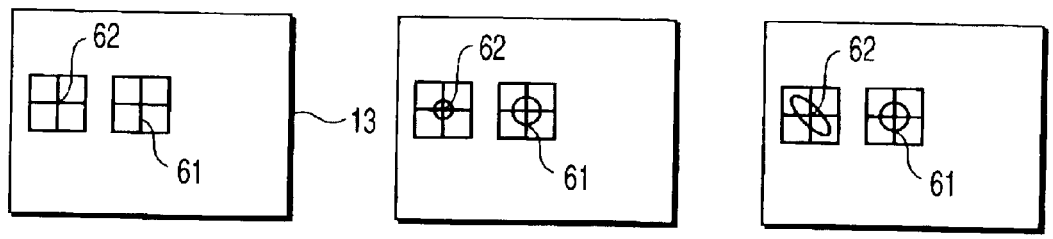
FIGS. 3A to 3C are diagrams showing various light-receiving regions that the photodetector provided in the embodiment may have.

As FIG. 3A shows, the photodetector 13 has two light-receiving regions 61 and 62, each comprises four segments.

The light-receiving region 61 receives the 0th-order light beam 201-0 generated by the hologram 12. From the 0th-order light beam 201-0 there will be generated a reproduced signal, a focusing error signal and a tracking error signal.

The 0th-order light beam 202-0 that the hologram 12 has generated from the reflected light beam 104 has a large diameter. Therefore, the beam 202-0 does not impose whatever influence on the generation of signals from the 0th-order light beam 201-0 generated from the reflected light beam 103. The sensitivity of detecting the focus error signal depends on the focal distances of the condenser lens 10 and cylindrical lens 11 that constitute an astigmatism-detecting system.

On the other hand, the first-order diffracted light beam 202-1 that the hologram 12 has generated from the reflected light beam 104 is received at the light-receiving region 62. From the diffracted light beam 202-1 there will be generated a focusing error signal. The first-order diffracted light beam 201-1 has a large diameter. Therefore, the beam 201-2 does not influence the generation of a focusing error signal from the first-order diffracted light beam 202-1.

The sensitivity of detecting the focus error signal depends upon the focal distances of the condenser lens 10 and cylindrical lens 11 that constitute an astigmatism-detecting system and also upon the astigmatism of the center part 51 of the polarized hologram 5.

To detect the spherical aberration, such a spherical aberration component and such an astigmatism component that may lower the level of the focusing error signal to zero (0), are imparted to the center part 51 of the hologram 5 as will change the level of the focus error signal generated from the first-order diffracted light beam 202-1, if the focusing control on an optical disk having a transparent substrate of the standard thickness is performed based on the 0th-order light beam 201-0.

In this case, the 0th-order light beam 201-0 generated from the reflected light beam 103 and received at the light-receiving region 61 and the first-order diffracted light beam 202-1 generated from the reflected light beam 104 and received and the light-receiving region 62 form light spots that represent no focusing errors as is illustrated in FIG. 3B.

Focusing control may be performed on an optical disk 9 that comprises a transparent substrate 9a having a thickness different from the standard thickness, based on the 0th-order light beam 201-0. In this case, the first-order diffracted light beam 202-1 generated from the reflected light 104 and received at the light-receiving region 62 forms an elliptical light spot that represents a focusing error as is illustrated in FIG. 3C.

Figure 4:
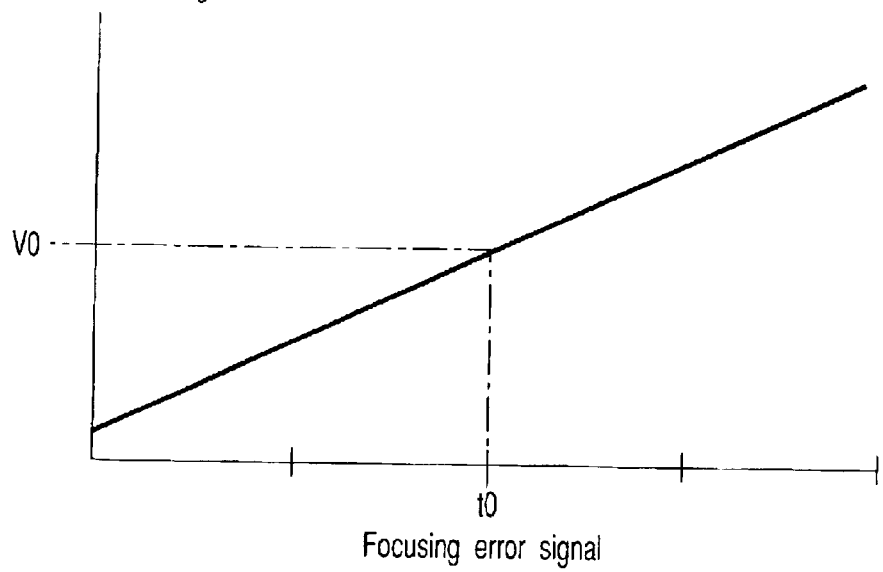
FIG. 4 is a graph representing the relation between a focusing error signal and the thickness error of a transparent substrate, which is observed in the embodiment.

If this is the case, the focusing error signal generated from the signal output from the light-receiving region 62 is not at zero (0) level. The focusing error signal has a value that is proportional to the thickness error of the transparent substrate 9a. In other words, the focusing error signal has a value proportional to the difference between the thickness of the substrate 9b and the standard thickness that the substrate 9a should have as shown in FIG. 4.

A factor of proportionality is obtained from this proportional relation. The signal output from the light-receiving region 62 is multiplied by the factor of proportionality. A signal is thereby generated, which corresponds to the thickness error of the transparent substrate 9a of the optical disk 9.

The polarized hologram 5 may be located between the semiconductor laser 2 and the polarized beam splitter 4. In this case, too, the same advantage can be attained. Further, the same advantage can be attained even if the polarized hologram 5 and the polarized beam splitter 4 are replaced by a non-polarized hologram and a non-polarized beam splitter, respectively, provided that the non-polarized hologram is arranged between the semiconductor laser 2 and the non-polarized beam splitter.

A value by which to compensate for the spherical aberration resulting from the thickness error of the transparent substrate 9a can be determined from the signal thus generated and representing the thickness error of the transparent substrate 9a. The value thus determined is utilized to compensate for the spherical aberration.

Figure 5:
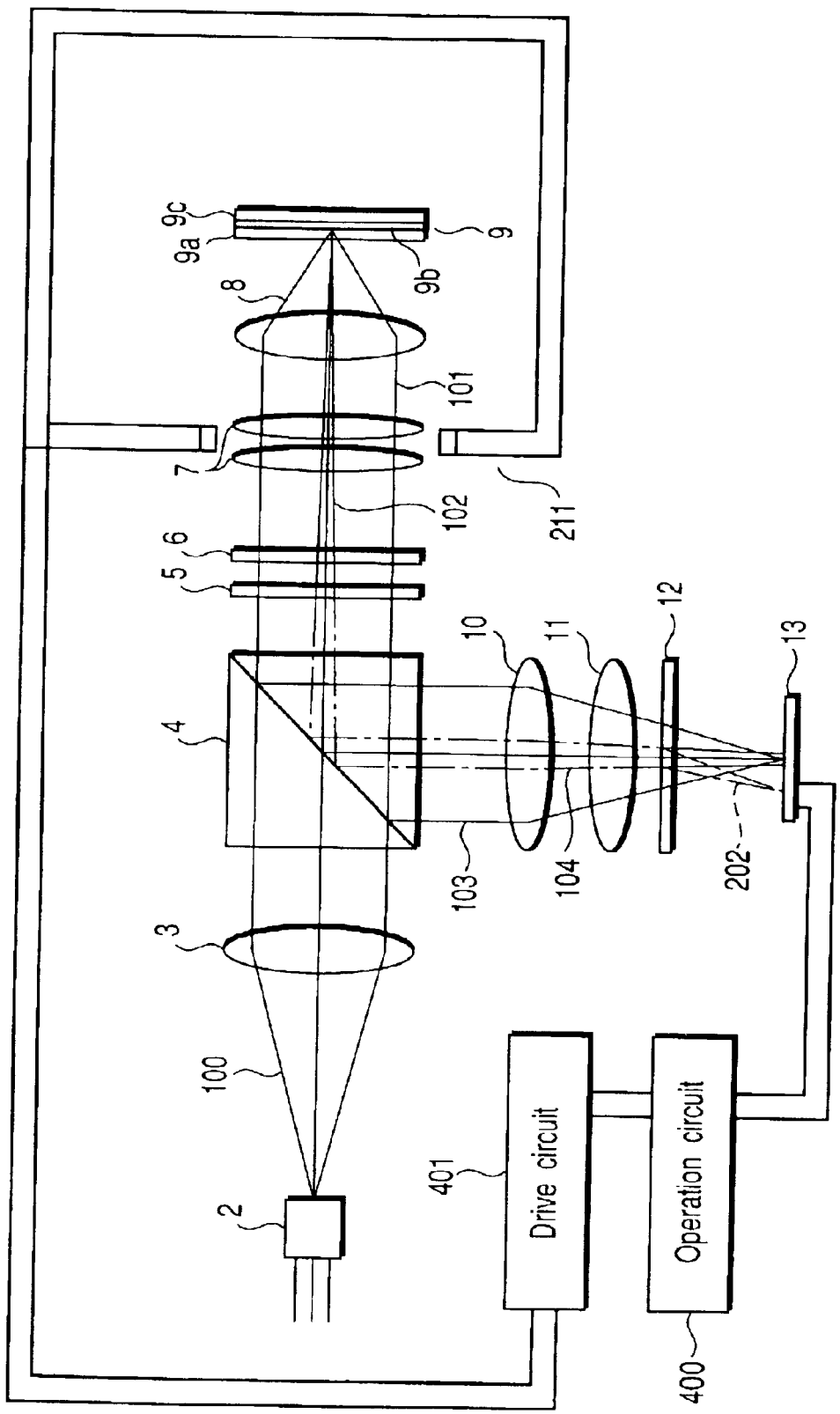
FIG. 5 is a diagram showing means provided in the embodiment and designed to compensate for the thickness error of a transparent substrate.

FIG. 5 shows an optical disk apparatus comprising the optical head described above. In the apparatus, the signal output from the light-receiving region 62 that has received the first-order diffracted light beam 202-1 is supplied to an operation circuit 400. The operation circuit 400 generates a control signal for compensating the thickness error of the transparent substrate 9a of the optical disk 9. The control signal is supplied to a drive circuit 401. The drive circuit 401 drives an actuator 211 in accordance with the control signal. Thus driven, the actuator 211 controls the spherical-aberration compensating mechanism 7. The mechanism 7 can compensate for the spherical aberration.

The spherical-aberration compensating mechanism 7 comprises a planoconvex lens and a planoconcave lens. The actuator 211 moves the planoconvex lens along the optical axis, whereby the mechanism 7 performs its function.

If the transparent substrate 9a of the optical disk 9 has no thickness error, the distance between the planoconvex lens and the planoconcave lens is set so that the mechanism 7 may output a light beam that is identical in wavefront to the is identical to the light beam applied to the mechanism 7. If the transparent substrate 9a of the optical disk 9 has a thickness error, the distance between these lenses is changed so that the spherical-aberration compensating mechanism 7 may output a light beam that has spherical aberration at its wavefront.

The distance between the planoconvex lens and the planoconcave lens is proportional to the thickness error of the transparent substrate 9a. Hence, it suffices to use the thickness error signal concerning the transparent substrate 9a in order to change the distance between the planoconvex lens and the planoconcave lens. This makes it easy to compensate for the spherical aberration that has resulted from the thickness error of the transparent substrate 9a.

Figure 6:
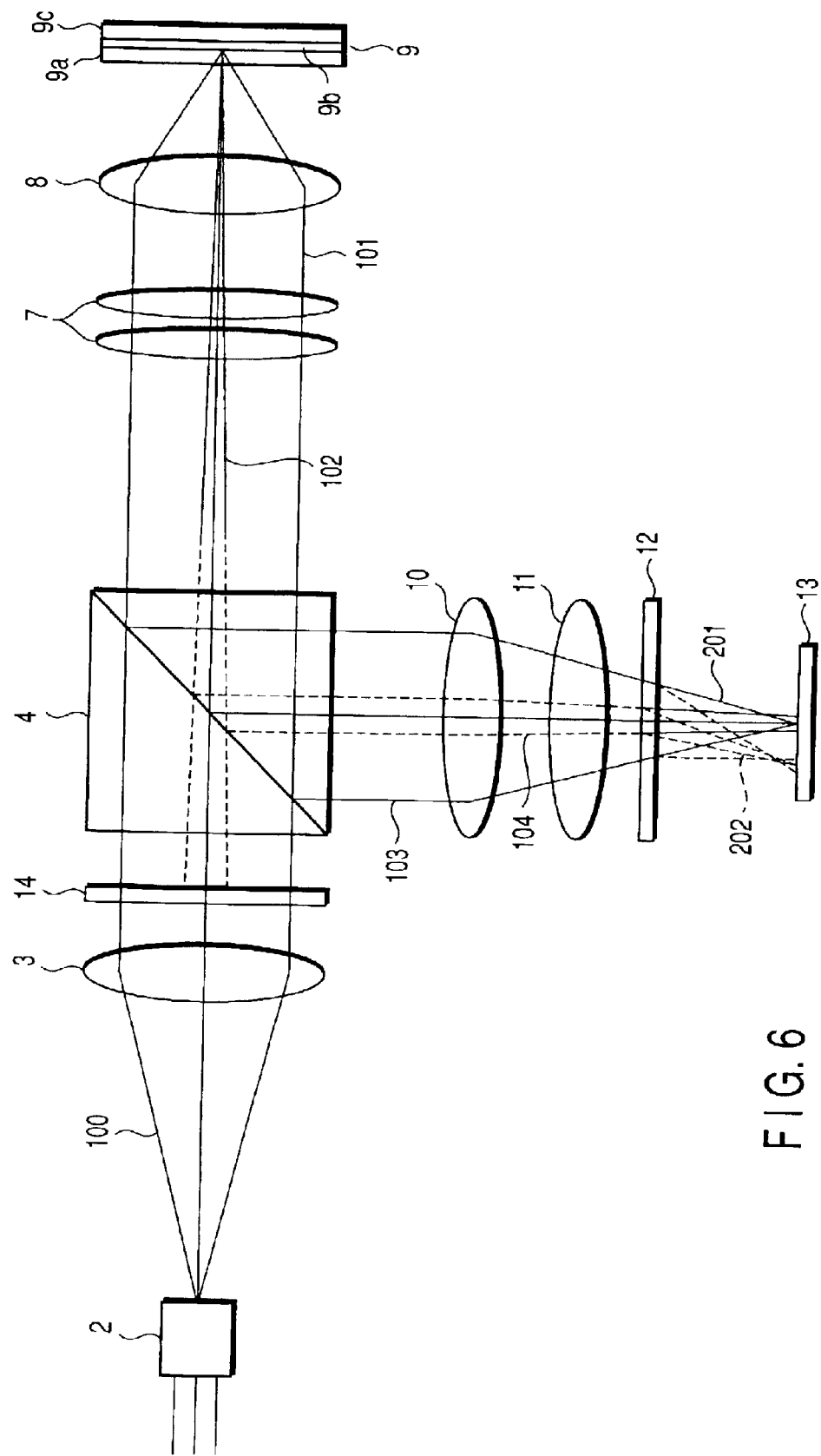
FIG. 6 is a diagram illustrating a modification of the embodiment.

FIG. 6 illustrates a modification of the embodiment described above. In FIG. 6, the components identical to those depicted in FIG. 1 are designated at the same reference numerals. As FIG. 6 shows, the modification has no components equivalent to the polarized hologram 5 and the quarter-wave plate 6. The modification comprises a hologram 14 interposed between the collimate lens 3 and the polarized beam splitter 4. The hologram 14 performs a function similar to that of the polarized hologram 5.

The modification can operate in substantially the same way as the embodiment of FIG. 1. It can therefore achieve substantially the same advantage.

What is claimed is:

1. An optical head which focuses a light beam emitted from a light source, on an optical disk through an objective lens, and which receives a light beam reflected from the optical disk and applied through the objective lens and converts the received light beam, into an electric signal, said optical head comprising:

a first optical system which guides the light beam emitted from the light source, to the objective lens, and which comprises a polarized light splitter transmitting the light beam from the light source and a first hologram provided between the polarized light splitter and the objective lens and having a first region and a second region, said first region being incapable of diffracting light beams and said second region being capable of diffracting light beams;

a second optical system which comprises a second hologram, which splits a light beam reflected from the optical disk, applied through the objective lens, and reflected from the polarized light splitter into a first light beam and a second light beam, said first light beam having passed trough the first region of the first hologram, and said second light beam having passed through the second region of the first hologram, a photodetector which converts the first and second light beams generated by the second hologram, into electric signals, wherein the first optical system is configured to cause the objective lens to focus the light beam on a recording surface of the optical disk after the light beam has passed through the first region of the first hologram, and to focus the light beam on a surface, which faces the objective lens, of a transparent substrate of the optical disk after the light beam has passed through the second region of the first hologram, wherein the photodetector includes a first light-receiving region which receives the first light beam split by the second hologram and a second light-receiving region which receives the second light beam split by the second hologram, wherein the first and second light-receiving regions are spaced apart to generate signals that are to be processed to correspond to a focusing error of the objective lens, and wherein the first optical system comprises a spherical aberration-compensating element for imparting spherical aberration to the light beam applied to the objective lens through the first hologram.

2. An optical disk apparatus comprising:

an optical head comprising:

first optical system which guides the light beam emitted from a light source, to an objective lens through a first hologram having a first region and a second region, said first region being incapable of diffracting light beams and said second region being capable of diffracting light beams;

second optical system which guides a light beam reflected from an optical disk and applied through the objective lens, to a second hologram, which splits the light beam into a first light beam and a second light beam, said first light beam having passed through the first region of the first hologram, and said second light beam having passed through the second region of the first hologram; and a photodetector having a first light-receiving region which receives the first light beam from the second hologram and a second light-receiving region which receives the second light beam from the second hologram, said first and second light-receiving regions being spaced part to generate signals that are to be processed to correspond to a focusing error of the objective lens, and a detecting section which generates a first focusing error signal from a signal output from the first light-receiving region, generates a second focusing error signal from a signal output from the second light-receiving region, and detects a thickness error of a transparent substrate of the optical disk, from the first and second focusing error signals.

3. The optical disk apparatus according to claim 2, wherein the detecting section generates a signal corresponding to the thickness error of the transparent substrate, from the second focusing error signal, while maintaining the first focusing error signal at a level indicating that no focusing error exists.

4. The optical disk apparatus according to claim 2, further comprising a compensating section which compensates for spherical aberration resulting from the thickness error of the transparent substrate, in accordance with the thickness error detected by the detecting section.

5. An optical head which focuses a light beam emitted from a light source, on an optical disk through an objective lens, and which receives a light beam reflected from the optical disk and applied through the objective lens, into an electric signal, said optical head comprising:

a first optical system which guides the light beam emitted from the light source, to the objective lens, and which comprises a polarized light splitter transmitting the light beam from the light source and a first hologram provided between the light source and the polarized light splitter and having a first region and a second region, said first region being incapable of diffracting light beams and said second region being capable of diffracting light beams;

a second optical system which comprises a second hologram, which splits a light beam reflected from the optical disk, applied through the objective lens, and reflected from the polarized light splitter into a first light beam and a second light beam, said first light beam having passed through the first region of the first hologram, and said second light beam having passed through the second region of the first hologram; and a photodetector which converts the first and second light beams generated by the second hologram, into electric signals, wherein the first optical system is configured to cause the objective lens to focus a light beam on a recording surface of the optical disk after the light beam has passed through the first region of the first hologram, and to focus a light beam on a surface, which faces the objective lens, of a transparent substrate of the optical disk after the light beam has passed through the second region of the first hologram, wherein the photodetector has a first light-receiving region which receives the first light beam from the second hologram and a second light-receiving region which receives the second light beam from the second hologram, wherein the first and second light-receiving regions are spaced apart to generate signals that are to be processed to correspond to a focusing error of the objective lens, and wherein the first optical system comprises a spherical aberration-compensating element for imparting spherical aberration to the light beam applied to the objective lens through the first hologram.

* * * * *